United States Patent
Black et al.

(10) Patent No.: US 7,971,101 B2
(45) Date of Patent: Jun. 28, 2011

(54) SYSTEMS AND METHODS FOR MANAGEMENT AND CAPTURING OF OPTICAL DRIVE FAILURE ERRORS

(75) Inventors: William A. Black, Austin, TX (US); Nafisa Muzaffar, Austin, TX (US); Manuel Rivera, Jr., Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 971 days.

(21) Appl. No.: 11/346,122

(22) Filed: Feb. 2, 2006

(65) Prior Publication Data

US 2007/0180330 A1    Aug. 2, 2007

(51) Int. Cl.
*G06F 11/00*    (2006.01)
(52) U.S. Cl. .......................................... 714/42; 714/54
(58) Field of Classification Search .................... 714/42, 714/54
See application file for complete search history.

(56) References Cited

U.S. PATENT DOCUMENTS

| | | | |
|---|---|---|---|
| 5,422,890 A * | 6/1995 | Klingsporn et al. | 714/723 |
| 5,719,885 A * | 2/1998 | Ofer et al. | 714/6 |
| 5,954,827 A | 9/1999 | Frank et al. | |
| 6,049,896 A | 4/2000 | Frank et al. | |
| 7,136,768 B1 * | 11/2006 | Shah et al. | 702/115 |
| 7,293,203 B1 * | 11/2007 | Coatney et al. | 714/42 |
| 7,308,609 B2 | 12/2007 | Dickenson et al. | |
| 7,418,622 B2 * | 8/2008 | Okamoto et al. | 714/6 |
| 2002/0181356 A1 * | 12/2002 | Watanabe et al. | 369/47.16 |
| 2003/0147169 A1 * | 8/2003 | Smith | 360/73.01 |
| 2005/0071580 A1 * | 3/2005 | LeClerg et al. | 711/154 |
| 2005/0099919 A1 * | 5/2005 | Lee | 369/53.2 |
| 2006/0106972 A1 * | 5/2006 | Gorobets et al. | 711/103 |

* cited by examiner

*Primary Examiner* — Christopher S McCarthy
(74) *Attorney, Agent, or Firm* — Baker Botts L.L.P.

(57) ABSTRACT

The systems and methods herein may be used for management and capturing of optical drive failure errors. One implementation of a method for capturing a failure error of an optical storage drive may include detecting the failure error of the optical storage drive. The failure error may be characterized by an error identifier, which may be stored in a drive memory. In certain embodiments, methods herein may also include storing media information available on optical storage media to the extent that such media information may be available. Among other advantages, storage of error identifiers and/or media information may aid manufacturers in diagnosing problems with returned optical storage drives.

12 Claims, 4 Drawing Sheets

SYSTEMS AND METHODS FOR MANAGEMENT AND CAPTURING OF OPTICAL DRIVE FAILURE ERRORS

TECHNICAL FIELD

The present disclosure relates generally to computer systems and information handling systems, and, more particularly, to a system and method for capturing and storing one or more failure errors of an optical storage drive and optionally, capturing media information, if desired.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing, or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system may comprise one or more optical storage drives. The optical storage drives may be read-only, writable, or rewritable. Examples of optical drives include CD and DVD drives.

Optical storage drives may experience failure errors when reading or writing data to optical storage media. Diagnosing failures in optical storage drives may be problematic for a variety of reasons. Often, when a failure error such as a read or write error occurs, the associated error code may be reported to the operating system, and the operating system or software utility may inform the user of the failure error, but the details of the failure including the media information and failure error description may never be disclosed to the user or may never be stored for later use or diagnosis. Even when the failure error information is disclosed to the user, the failure error information may be too generic, not complete, and/or inaccurate.

Further compounding the problem of diagnosing optical storage drive failures is the lack of information as to the media used when the failure error occurred. Often, the media used is not returned with the optical storage drive to the manufacturer so the information relating to the media used may not be available to the manufacturer for failure error diagnosis.

SUMMARY

In accordance with the present disclosure, a system and method is disclosed for the management and capturing of optical drive failure errors. One implementation of a method of capturing a failure error of an optical storage drive may include detecting the failure error of the optical storage drive. The failure error may be characterized by an error identifier, which may be stored in a drive memory. In certain embodiments, methods herein may also include storing media information available on optical storage media to the extent that such media information may be available. Additionally, some embodiments may include the detection and storage of a plurality of error identifiers. Systems implementing the methods herein are also disclosed.

Among other advantages, storage of error identifiers and/or media information may aid manufacturers in diagnosing problems with returned optical storage drives. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
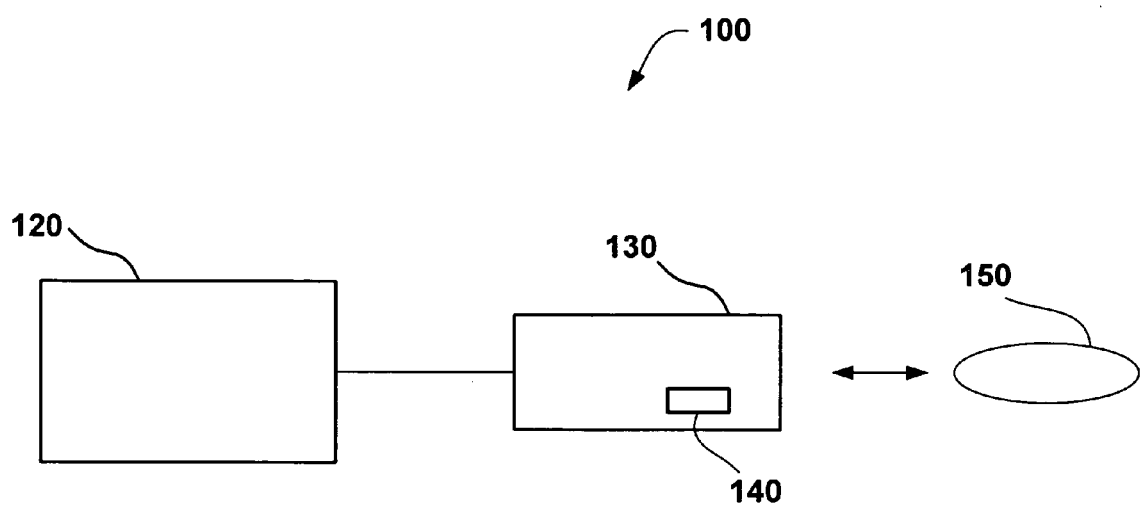
FIG. 1 shows a diagram of an optical storage drive interacting with an operating system and optical storage media.

FIG. 1 shows one example of an information handling system 100, which may include an operating system 120 communicatively coupled to one or more optical storage drives 130. Optical storage drive 130 may include various types of integrated memory, including in some cases, nonvolatile memory 140. Optical storage drives allow for the reading of and in some cases, the storage of large amounts of information or data on optical storage media. Optical storage media 150 is any media capable of containing information on the media in such a way that an optical reading device may read or decode the information. Optical storage media includes, but is not limited to CDs and DVDs. The term optical storage drive, as used herein, is not limited to any particular format but includes at least CD-ROM, CD-R, CD-RW, DVD-RAM, DVD±R, DVD±RW, single-layer media, double-layer media, or any combination thereof.

Optical storage drives may experience failure errors when reading or writing data to optical storage media. The failure errors are typically associated with or characterized by error identifiers, which may further describe the type of error experienced. In some cases, error identifiers may also be referred to as error sense codes. The number and types of error identifiers that an optical storage drive may experience are varied and numerous. Examples include error sense codes such as, 03/11 (unrecoverable read error) and 03/02 (seek error).

Optical storage media may include media information stored on the optical storage media. Media information may include any variety of information about the media and/or the manufacturer identity of the optical storage media. For example, in the case of pressed media, the media information may include manufacture media information, and in the case of recordable media, the media information may include embedded track information. Embedded track information may include ATIP (Actual Time in Pregroove) for CD formats, ADIP (Address in Pregroove) for DVD formats, or any other embedded track information. Depending on the particular optical storage media, the media information may or may not be available on the optical storage media.

Optical storage drives may have a drive memory capable of storing information or data. Often, at least a portion of the drive memory may be a nonvolatile memory. Although this nonvolatile memory may be intended for uses such as firmware updates, the methods herein recognize that a portion of this memory may be set aside for the purpose of storing error identifiers and/or media information.

Figure 2:
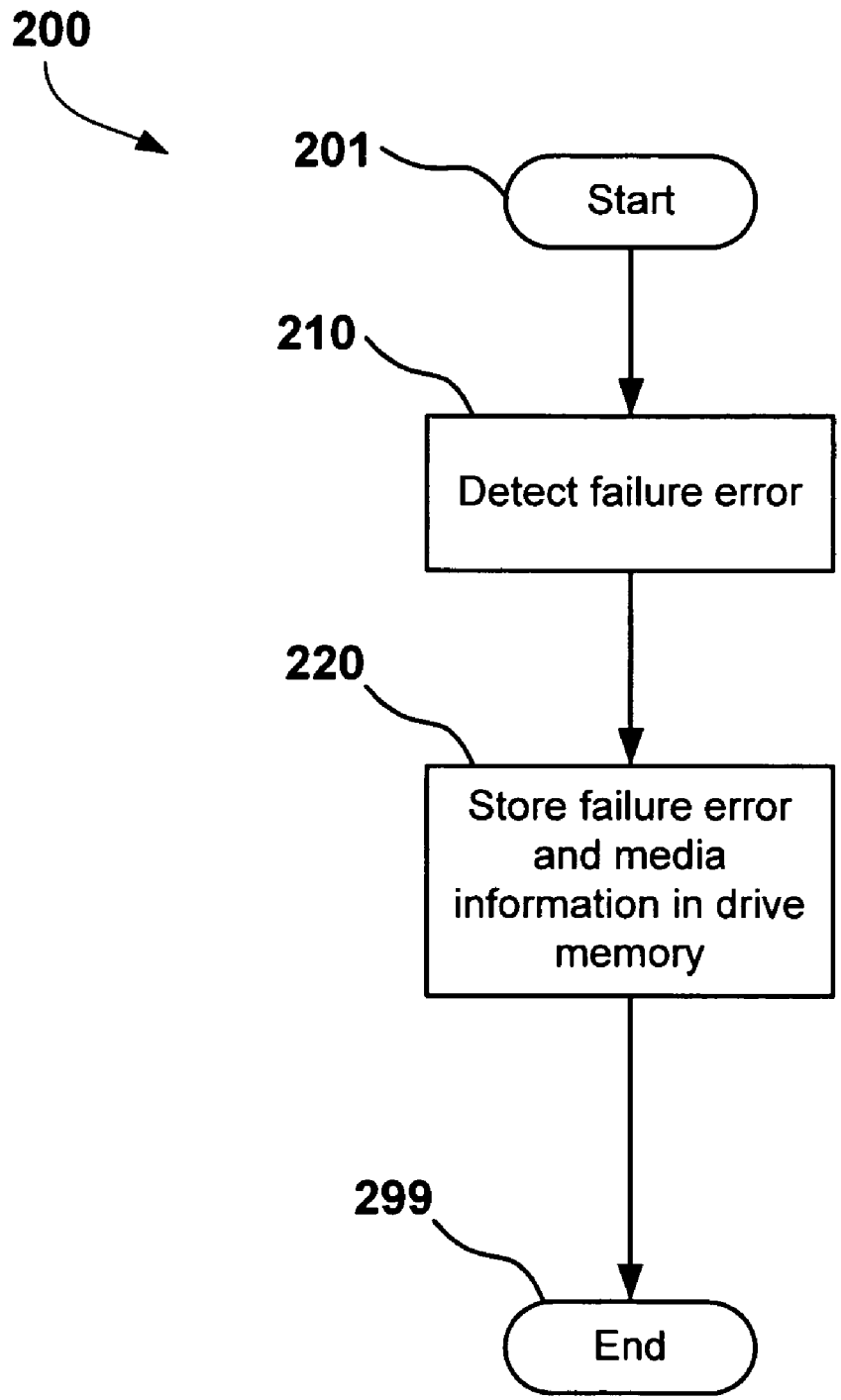
FIG. 2 is a flow chart illustrating one implementation of a method for capturing a failure error of an optical storage drive.

The flow chart of FIG. 2 illustrates one implementation of a method for capturing a failure error of an optical storage drive. Method 200 begins at step 201. At step 210, a failure error is detected. At step 220, the failure error, which may be characterized by an error identifier, is stored in the drive memory. Additionally, any media information stored on the optical storage media, if available, may be stored in the drive memory as well. In preferred embodiments, the drive memory may be a nonvolatile memory, and in still other embodiments, the drive memory may be a flash type nonvolatile memory. As would be recognized by a person of ordinary skill in the art with the benefit of this disclosure, the media information may be stored before the storing of the error identifier or vice-versa.

Figure 3:
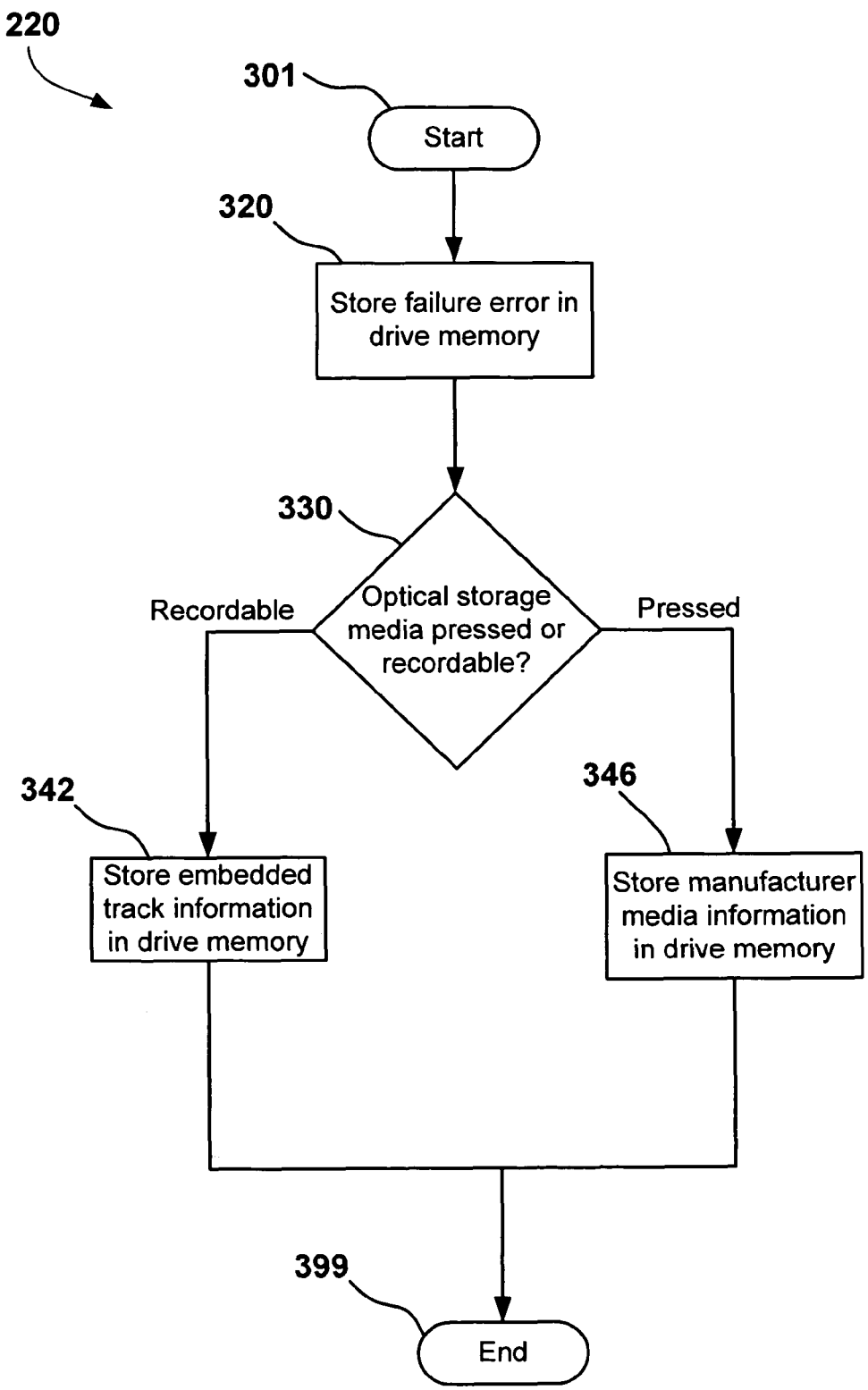
FIG. 3 is a flow chart illustrating one implementation of a method for storing a failure error and media information in a drive memory of an optical storage drive.

The flow chart of FIG. 3 illustrates one implementation of a method for storing a failure error and media information in a drive memory of an optical storage drive. FIG. 3 generally describes an example of one implementation of method 220 of FIG. 2. Method 220 begins at step 301. The failure error, which may be characterized by an error identifier is stored in the drive memory at step 320.

At step 330, a determination is made as to whether the optical storage media is a pressed media or a recordable media. If the optical storage media is a recordable media, method 220 continues to step 342, storing the embedded track information in the drive memory. Embedded track information may include actual time in pregroove media information (ATIP) for CD formats, address in pregroove media information (ADIP) for DVD formats, or any other embedded track information. If the optical storage media is a pressed media, method 220 continues to step 346, storing the manufacturer media information in the drive memory. The manufacturer media information may include, for example, information relating to the manufacturer identity. Depending on the particular optical storage media, the media information may or may not be available on the optical storage media.

Figure 4:
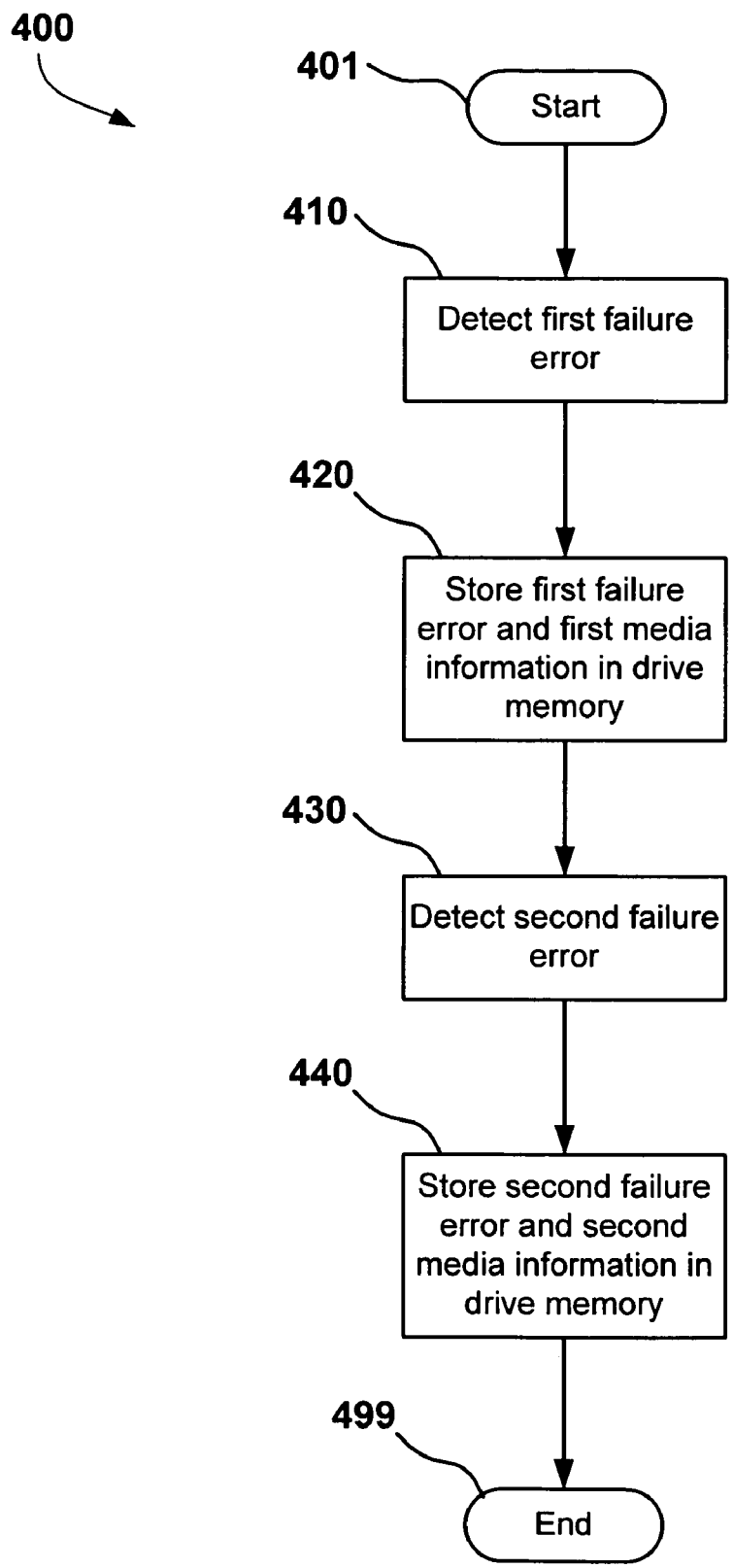
FIG. 4 is a flow chart illustrating one implementation of a method for detecting and storing multiple failure errors in a drive memory of an optical storage drive.

FIG. 4 is a flow chart illustrating one implementation of a method for detecting and storing multiple failure errors in a drive memory of an optical storage drive. Method 400 begins generally at step 401. A first failure error is detected at step 410. The first failure error, which may be characterized by a first error identifier, is stored in the drive memory at step 420 along with any first media information, if available, at step 420. In some embodiments, the storing of the media information may be optional.

At step 430, a second failure error, which may be characterized by a second error identifier, is stored in the drive memory while retaining the first error identifier in the drive memory. As depicted in step 440, any second media information may be stored along with the second error identifier as well. The second media information may be the same media information as the first media information, for example, if the optical storage media is the same as when the first failure error occurred. In preferred embodiments, the first error identifier is retained in the drive memory after storing the second error identifier. Method 400 ends at step 499.

As used herein, the terms, "first" and "second" with respect to "first failure error" and "second failure error," do not signify any absolute sequence among other failure errors, instead only denoting a relative relationship of the failure errors with respect to each other. That is, "first" does not mean prior to all other occurrences, but instead merely refers to being precedent to the "second" failure error. Likewise, the term, "second" merely indicates that the "second failure error" occurs at sometime after the occurrence of the "first failure error."

As used herein, the term, "retaining in the drive memory" allows temporary erasure of the failure error and/or media information to allow rewriting the information to be saved depending on the particular type of drive memory and file system implementation used. Thus, the storing and retaining of a plurality of failure errors, as used herein, only requires that at least a plurality of failure errors experienced be stored for later retrieval by the end of a method.

A variety of drive memory types may be used with the systems of the present invention. In preferred embodiments, nonvolatile memory is used for the drive memory to allow storage of the error data without power. In certain embodiments, flash type memory is used for the drive memory. Because certain types of nonvolatile memory are limited to a finite number of write cycles before failure, a wear leveling write file system may be used in certain embodiments to spread out equally the data storage along portions of the drive memory. Additionally, in certain embodiments, the storing of data in the drive memory may be implemented using a first-in first-out (FIFO) stack implementation. A FIFO stack implementation allows the oldest data stored to be deleted to allow storage of the most recent failure error and/or media information in the event the capacity of the portion of the drive memory being used is reached.

As a person of ordinary skill in the art with the benefit of this disclosure would recognize, modifications, additions, or omissions may be made to the procedure without departing from the scope of the invention. The procedure may include more, fewer, or other steps. Additionally, steps may be performed in any suitable order without departing from the scope of the invention. Although the present disclosure has been described in detail, it should be understood that various changes, substitutions, and alterations can be made hereto without departing from the spirit and scope of the invention as defined by the appended claims.

Although the present disclosure has been described in detail, it should be understood that various changes, substitutions, and alterations can be made hereto without departing from the spirit and the scope of the invention as defined by the appended claims.

What is claimed is:

1. A method of capturing a failure error of an optical storage drive comprising the steps of:
   detecting the failure error of the optical storage drive, the failure error characterized by an error identifier, wherein the optical storage drive has a drive memory, and wherein the optical storage drive is capable of reading an optical storage media, the optical storage media having media information stored on the optical storage media;
   determining a type of the optical storage media, wherein:
      if the type is a recordable optical media, then storing in the drive memory the media information from the recordable optical media, wherein the media information from the recordable optical media comprises embedded track media information;
      if the type is a pressed optical media, then storing in the drive memory the media information from the pressed optical media, wherein the media information from the pressed optical media comprises manufacturer identity media information; and
   storing the error identifier in the drive memory.

2. The method of claim 1 wherein the drive memory comprises nonvolatile memory.

3. The method of claim 2 wherein the nonvolatile memory is a flash type of memory.

4. The method of claim 3 wherein the storing of the first error identifier is accomplished through a wear leveling write file system and wherein the storing of the first error identifier and the second error identifier is implemented through a FIFO stack implementation.

5. The method of claim 1 wherein the error identifier is an error sense code.

6. The method of claim 1, wherein the recordable optical media comprises a CD media and the embedded track media information comprises ATIP media information.

7. A method of capturing a plurality of failure errors of an optical storage drive comprising the steps of:
   detecting a first failure error of the optical storage drive, the first failure error characterized by a first error identifier wherein the optical storage drive has a drive memory and wherein the optical storage drive is capable of reading a first optical storage media, the first optical storage media having a first media information stored on the first optical storage media;
   determining a first type of the first optical storage media;
   storing the first media information in the drive memory, wherein:
      if the first type is a recordable optical media, then the first media information comprises embedded track media information; and
      if the first type is a pressed optical media, then the first media information comprises manufacturer identity media information;
   wherein the recordable optical media comprises a CD media and the embedded track media information comprises ATIP media information;
   storing the first error identifier in the drive memory;
   detecting a second failure error of the optical storage drive, the second failure error characterized by a second error identifier wherein the optical storage drive has a second optical storage media, the second optical storage media having a second media information stored on the second optical storage media;
   storing the second error identifier in the drive memory while retaining the first identifier in the drive memory;
   determining a second type of the second optical storage media; and
   storing the second media information in the drive memory while retaining the first error identifier, the first media information, and the second error identifier in the drive memory, wherein:
      if the second type is a recordable optical media, then the second media information comprises embedded track media information; and
      if the second type is a pressed optical media, then the second media information comprises manufacturer identity media information.

8. The method of claim 7 wherein the drive memory comprises a nonvolatile memory.

9. The method of claim 8 wherein the nonvolatile memory is a flash type of memory.

10. The method of claim 9 wherein the storing of the first error identifier is accomplished through a wear leveling write file system and wherein the storing of the first error identifier and the second error identifier is implemented through a FIFO stack implementation.

11. The method of claim 7 wherein the second optical storage media is the same storage optical storage media as the first optical storage media.

12. A method of capturing a plurality of failure errors of an optical storage drive comprising the steps of:
   detecting a first failure error of the optical storage drive, the first failure error characterized by a first error identifier wherein the optical storage drive has a drive memory and wherein the optical storage drive is capable of reading a first optical storage media, the first optical storage media having a first media information stored on the first optical storage media;
   determining a first type of the first optical storage media;
   storing the first media information in the drive memory, wherein:
      if the first type is a recordable optical media, then the first media information comprises embedded track media information; and
      if the first type is a pressed optical media, then the first media information comprises manufacturer identity media information;
   wherein the recordable optical media comprises a DVD media and the embedded track media information comprises ADIP media information;
   storing the first error identifier in the drive memory;
   detecting a second failure error of the optical storage drive, the second failure error characterized by a second error identifier wherein the optical storage drive has a second optical storage media, the second optical storage media having a second media information stored on the second optical storage media;
   storing the second error identifier in the drive memory while retaining the first identifier in the drive memory;
   determining a second type of the second optical storage media; and
   storing the second media information in the drive memory while retaining the first error identifier, the first media information, and the second error identifier in the drive memory, wherein:
      if the second type is a recordable optical media, then the second media information comprises embedded track media information; and
      if the second type is a pressed optical media, then the second media information comprises manufacturer identity media information.

* * * * *